US009992369B2

(12) United States Patent
Ishiguro et al.

(10) Patent No.: US 9,992,369 B2
(45) Date of Patent: Jun. 5, 2018

(54) IMAGE FORMING APPARATUS HAVING DISPLAY SECTION DISPLAYING ENVIRONMENTAL CERTIFICATION INFORMATION DURING STARTUP AND BEING FOLDABLE INTO A GENERALLY FLUSH ACCOMMODATED STATE

(71) Applicant: Sharp Kabushiki Kaisha, Sakai, Osaka (JP)

(72) Inventors: Yasuyuki Ishiguro, Sakai (JP); Hisashi Kunihiro, Sakai (JP); Hitoshi Nagahama, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days. days.

(21) Appl. No.: 15/435,588

(22) Filed: Feb. 17, 2017

(65) Prior Publication Data
US 2017/0163831 A1 Jun. 8, 2017

Related U.S. Application Data

(63) Continuation of application No. 13/334,299, filed on Dec. 22, 2011, now abandoned.

(30) Foreign Application Priority Data

Dec. 27, 2010 (JP) .................................. 2010-291198

(51) Int. Cl.
*H04N 1/00* (2006.01)
(52) U.S. Cl.
CPC ..... *H04N 1/00891* (2013.01); *H04N 1/00408* (2013.01); *H04N 1/00928* (2013.01); *H04N 2201/0094* (2013.01)

(58) Field of Classification Search
CPC .......... H04N 1/00408; H04N 1/00891; H04N 1/00928; H04N 2201/0094
USPC ................................................. 358/1.14, 1.15
See application file for complete search history.

(56) References Cited

U.S. PATENT DOCUMENTS

| 5,367,454 A | * | 11/1994 | Kawamoto | ............ G06N 3/004 345/418 |
| 5,614,933 A | * | 3/1997 | Hindman | ................. B41J 2/005 347/103 |
| 5,712,654 A | * | 1/1998 | Kawashima | ........ G06F 3/04817 700/83 |
| 6,813,037 B1 | * | 11/2004 | Collard | ............. G03G 15/5075 358/1.15 |

(Continued)

FOREIGN PATENT DOCUMENTS

| JP | 06-149412 A | | 5/1994 |
| JP | 2001010174 A | * | 1/2001 |

(Continued)

*Primary Examiner* — Edwin S Leland, III
(74) *Attorney, Agent, or Firm* — Birch, Stewart, Kolasch & Birch, LLP

(57) ABSTRACT

The image forming apparatus of the present invention includes an operation accepting means for accepting an instruction, and a display controlling means for controlling a display section. The display controlling means controls the display section to display at least environmental information, which has been obtained by the image forming apparatus, at predetermined timing at which no instruction corresponding to a job is accepted by the operation accepting means.

10 Claims, 13 Drawing Sheets

(56) References Cited

U.S. PATENT DOCUMENTS

| | | | | |
|---|---|---|---|---|
| 7,397,476 B2* | 7/2008 | Akaiwa | | G03B 21/14 345/162 |
| 7,619,766 B2* | 11/2009 | Tsuzuki | | H04N 1/00278 358/1.15 |
| 8,564,936 B2* | 10/2013 | Ejima | | H04M 1/0237 345/169 |
| 2003/0076330 A1* | 4/2003 | Owen | | G06F 3/14 345/581 |
| 2005/0083351 A1* | 4/2005 | Kawamoto | | H04M 1/021 345/660 |
| 2005/0179935 A1* | 8/2005 | Ogura | | H04N 1/00888 358/1.14 |
| 2005/0231758 A1* | 10/2005 | Reynolds | | G03G 15/5075 358/1.15 |
| 2006/0031716 A1* | 2/2006 | Chen | | G06F 11/2284 714/36 |
| 2006/0291884 A1* | 12/2006 | Okamoto | | G03G 15/5004 399/69 |
| 2007/0013949 A1* | 1/2007 | Jeong | | G06F 3/1204 358/1.15 |
| 2007/0080957 A1* | 4/2007 | Ishida | | B41J 29/02 345/418 |
| 2007/0086064 A1* | 4/2007 | Koyama | | G06Q 10/107 358/402 |
| 2007/0124509 A1* | 5/2007 | Kelley | | G06F 1/3203 710/5 |
| 2007/0165262 A1* | 7/2007 | Watanabe | | G03G 15/5004 358/1.14 |
| 2007/0165275 A1* | 7/2007 | Iizuka | | G06F 3/1204 358/1.15 |
| 2007/0201076 A1* | 8/2007 | Ishida | | G03G 15/5004 358/1.14 |
| 2007/0201081 A1* | 8/2007 | Murayama | | H04L 67/36 358/1.15 |
| 2007/0279680 A1* | 12/2007 | Kim | | G03G 15/5016 358/1.15 |
| 2008/0008508 A1* | 1/2008 | Mizobuchi | | G03G 21/02 399/389 |
| 2008/0079716 A1* | 4/2008 | Lynch | | G06T 15/02 345/419 |
| 2008/0158597 A1* | 7/2008 | Hashimoto | | G06F 21/608 358/1.15 |
| 2008/0239374 A1* | 10/2008 | Yamaguchi | | H04N 1/2179 358/1.15 |
| 2008/0259378 A1* | 10/2008 | Suzuki | | G03G 15/5004 358/1.14 |
| 2009/0110427 A1* | 4/2009 | Ishizuka | | B41J 3/46 399/88 |
| 2009/0164264 A1* | 6/2009 | Zolezzi | | G06Q 10/0639 705/7.38 |
| 2009/0238351 A1* | 9/2009 | Naruse | | H04N 1/00408 379/110.01 |
| 2009/0309859 A1* | 12/2009 | Nishi | | G01J 1/0209 345/207 |
| 2010/0070216 A1* | 3/2010 | Murata | | G01R 22/10 702/61 |
| 2010/0138875 A1* | 6/2010 | Johnson | | G06Q 30/0601 725/60 |
| 2010/0149573 A1* | 6/2010 | Pat | | H04N 1/00477 358/1.13 |
| 2010/0161363 A1* | 6/2010 | Nakane | | G06Q 30/018 358/1.15 |
| 2010/0171983 A1* | 7/2010 | Asakawa | | H04N 1/00408 358/1.15 |
| 2010/0198967 A1* | 8/2010 | Takahashi | | H04N 1/00344 709/224 |
| 2010/0211509 A1* | 8/2010 | Jacobs | | G01R 21/133 705/302 |
| 2010/0274612 A1* | 10/2010 | Walker | | G05B 19/41865 705/7.11 |
| 2010/0309512 A1* | 12/2010 | Onoda | | G06F 3/0482 358/1.15 |
| 2010/0309514 A1* | 12/2010 | Tanaka | | G06F 3/121 358/1.15 |
| 2011/0069348 A1* | 3/2011 | Yoshitake | | G06F 3/1211 358/1.15 |
| 2011/0102328 A1* | 5/2011 | Chen | | G06F 1/1618 345/169 |
| 2011/0242003 A1* | 10/2011 | Osann, Jr. | | G06F 1/1616 345/173 |
| 2011/0286027 A1* | 11/2011 | Nozawa | | G03G 15/5004 358/1.14 |
| 2011/0310428 A1* | 12/2011 | Ciriza | | G06F 1/3203 358/1.15 |
| 2011/0317200 A1* | 12/2011 | Honda | | B41J 29/38 358/1.14 |
| 2012/0065802 A1* | 3/2012 | Seeber | | G06F 1/3203 700/295 |
| 2012/0131504 A1* | 5/2012 | Fadell | | F24D 19/1084 715/810 |
| 2012/0140272 A1* | 6/2012 | Funane | | G06F 3/1208 358/1.15 |
| 2012/0162683 A1* | 6/2012 | Kunihiro | | G03G 15/502 358/1.13 |
| 2012/0162690 A1* | 6/2012 | Ishiguro | | H04N 1/00408 358/1.14 |
| 2012/0162703 A1* | 6/2012 | Ishiguro | | G03G 15/502 358/1.15 |
| 2017/0163831 A1* | 6/2017 | Ishiguro | | H04N 1/00891 |

FOREIGN PATENT DOCUMENTS

| | | | | |
|---|---|---|---|---|
| JP | 2001-156972 A | | 6/2001 | |
| JP | 2001156972 A | * | 6/2001 | |
| JP | 2004-61739 A | | 2/2004 | |
| JP | 2004061739 A | * | 2/2004 | |
| JP | 2004-155124 A | | 6/2004 | |
| JP | 2004155124 A | * | 6/2004 | |
| JP | 2005-338195 A | | 12/2005 | |
| JP | 2005338195 A | * | 12/2005 | |
| JP | 2007-053433 | | 3/2007 | |
| JP | 2007053433 A | * | 3/2007 | |
| JP | 2007-86585 A | | 4/2007 | |
| JP | 2007-183826 A | | 7/2007 | |
| JP | 2007183826 A | * | 7/2007 | |
| JP | 2008015259 A | * | 1/2008 | G03G 21/02 |
| JP | 2008-165596 A | | 7/2008 | |
| JP | 2010-017909 A | | 7/2008 | |
| JP | 2009-88759 A | | 4/2009 | |
| JP | 2010-034636 A | | 2/2010 | |
| JP | 2010-201654 | | 9/2010 | |
| JP | 2010-208191 A | | 9/2010 | |
| JP | 2010201654 A | * | 9/2010 | |
| JP | 2014-094571 A | | 5/2014 | |
| WO | WO 2008135794 A1 | * | 11/2008 | G01K 17/00 |

* cited by examiner

FIG. 6

| | ENVIRONMENTAL INFORMATION NAME | MARK/LABEL IMAGE |
|---|---|---|
| 1 | PRODUCT COMPLIANT WITH THE LAW ON PROMOTING GREEN PURCHASING | |
| 2 | ECO MARK | |
| 3 | PRODUCT REGISTERED IN THE GPN DATABASE | |
| 4 | INTERNATIONAL ENERGY STAR PROGRAM | |
| 5 | CARBON FOOTPRINT LABEL | |
| 6 | NORDIC ENVIRONMENTAL LABEL (MARK) | |
| 7 | BLUE ANGEL LABEL (MARK) | |
| 8 | EURoHS DIRECTIVE-COMPLIANT LABEL (MARK) | |
| 9 | ECO-LEAF ENVIRONMENTAL LABEL (MARK) | |
| ⋮ | ⋮ | ⋮ |

IMAGE FORMING APPARATUS HAVING DISPLAY SECTION DISPLAYING ENVIRONMENTAL CERTIFICATION INFORMATION DURING STARTUP AND BEING FOLDABLE INTO A GENERALLY FLUSH ACCOMMODATED STATE

This application is a Continuation of U.S. patent application Ser. No. 13/334,299, filed on Dec. 22, 2011, which is a Non-provisional US application that claims priority under 35 U.S.C. § 119(a) to Patent Application No. 2010-291198 filed in Japan on Dec. 27, 2010, the entire contents of each application are hereby incorporated by reference.

FIELD OF THE INVENTION

The present invention relates to an image forming apparatus.

DESCRIPTION OF THE RELATED ART

In recent years, as part of the transition towards a low-carbon society, attention is being given to a carbon footprint system in which greenhouse gases, which are exhausted in an entire life cycle (from procurement of raw materials to disposal or recycle) of a product or a service, are converted into amounts of carbon dioxide so as to be indicated. With regard to an image forming apparatus also, a large amount of greenhouse gases are exhausted in procuring raw materials, in manufacturing, in distributing, in using and maintaining, and in discarding or recycling. Under the circumstances, efforts have been made for reducing greenhouse gases emitted due to an image forming apparatus.

There have been systems in which products, which can suppress emission of greenhouse gases, are labeled with information (hereinafter, referred to as "environmental information") which indicates that the products have been manufactured in an environmentally friendly manner.

The environmental information encompasses various kinds of information such as information indicating that a product conforms to the Law on Promoting Green Purchasing; information indicating that a product is conducive to environmental preservation because the product has been produced, by taking into consideration various effects on environment over entire life cycle; and information indicating that a product is under the guideline of Green Purchasing Network and is registered in the database. Details of such environmental information will be described in Description of Embodiments below.

Patent Literature 1 discloses an image forming apparatus which has an operation panel on which a service manual, which is image data, is displayed.

CITATION LIST

Patent Literature

[Patent Literature 1]
Japanese Patent Application Publication Tokukai No. 2010-34636 A (Publication date: Feb. 12, 2010)

SUMMARY OF INVENTION

Technical Problem

It is easily predictable that the number of kinds of environmental information will continue to increase, from the fact that there have already been a large number of kinds of environmental information. In order to make it known that the product is an environmentally friendly product, it is preferable to obtain a larger number of kinds of environmental information and attach labels of the environmental information to the product.

However, in a case where the labels are attached to the product, there is a problem that the labels will be peeled off due to passage of time. Moreover, since the label interferes with recycling of product, the label needs to be peeled off when recycling the product. In a case where a plurality of labels need to be peeled off, recyclability would further be lessened. In other words, in view of recyclability, it is preferable that the labels are not attached to the product.

The present invention is accomplished in view of the problem, and its object is to provide an image forming apparatus which can show the user environmental information, which has been obtained by the image forming apparatus, without lessening recyclability.

Solution to Problem

The present inventor first conceived a method for showing, without lessening recyclability, the user environmental information obtained by the image forming apparatus in which method labels and/or marks of pieces of environmental information are stored as image data and a display device of the image forming apparatus is caused to display images of the labels and/or marks (hereinafter, referred to as "mark/label image").

However, (i) the display section of the image forming apparatus needs to display a screen such as a setting screen for making various settings of processes which are to be carried out by the image forming apparatus, and (ii) a size of the screen is limited.

Under the circumstances, in a case where the mark/label images are displayed together with the setting screen, etc., it is difficult to secure a display area for such mark/label images. Even if such a display area can be secured, the area will be very small, unimposing, and less appealing. Moreover, if the mark/label images are displayed together with the setting screen, etc., it may happen that the user does not notice the displayed mark/label images because the user pays attention particularly to the setting screen. However, if the display area for the mark/label images is largely secured so that the mark/label images are emphasized, the display area for the setting screen becomes small. This makes it difficult for the user to make settings from the setting screen. In other words, such a small setting screen interferes with the original functions.

In view of the problem, an image forming apparatus of the present invention includes: operation accepting means for accepting an instruction corresponding to a job; and display controlling means for controlling a display section, the display controlling means controlling the display section to display at least environmental information, which has been obtained by the image forming apparatus, at predetermined timing at which no instruction is accepted by the operation accepting means.

According to the configuration, at least the environmental information, which has been obtained by the image forming apparatus, is displayed at the predetermined timing at which an instruction corresponding to a job is not accepted. Here, "the predetermined timing at which an instruction corresponding to a job is not accepted" is, for example, a period during which a warm-up operation is being carried out after a power source of the image forming apparatus is turned ON or a period during which a returning operation is being carried out in which the image forming apparatus is switched from an energy saving mode to a normal mode. There are some conventional image forming apparatuses in which a message "now warming up" or "please wait for a while" is displayed while the image forming apparatus is in the warm-up operation or in the returning operation, and while the message is being displayed, no instruction can be entered. Even in such a case, the present invention makes it possible to effectively let the user know, by displaying the environmental information, that the image forming apparatus of the present invention has been manufactured in an environmentally friendly manner, while the user cannot enter an instruction and waits, beside the image forming apparatus, for a completion of the warm-up operation or the returning operation.

According to the configuration of the present invention, the environmental information is displayed on the display section. With the configuration, even in a case where a label of environmental information is peeled off from the image forming apparatus, a serviceman does not need to obtain a label and to attach it to the image forming apparatus again. Furthermore, it is not necessary to attach a label of environmental information to the image forming apparatus in the first place. This allows an improvement in recyclability.

This makes it possible to provide an image forming apparatus which can show the user the environmental information without lessening recyclability.

Advantageous Effects of Invention

The present invention brings about effects of showing the user the environmental information, which has been obtained by the image forming apparatus, (i) at the timing at which the user is not hindered from using the image forming apparatus and (ii) without lessening recyclability.

BRIEF DESCRIPTION OF DRAWINGS

FIG. 6 illustrates a table in which environmental information is stored.

DETAILED DESCRIPTION OF THE INVENTION

Figure 1:
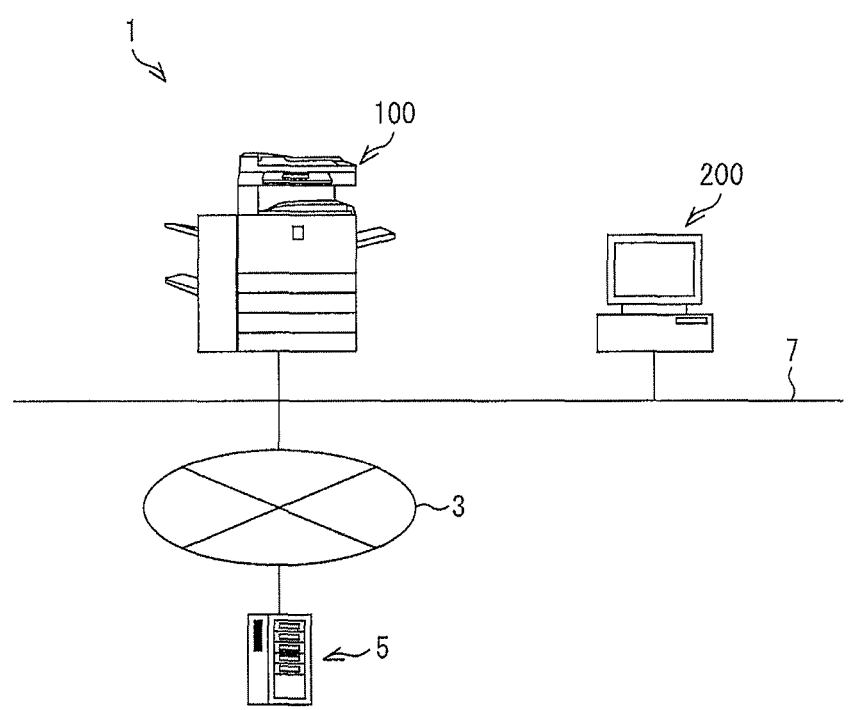
FIG. 1 schematically illustrates an example of an overall configuration of a display processing system in accordance with an embodiment of the present invention.

The following describes an embodiment of the present invention, with reference to drawings. In the following descriptions, the same reference numerals are given to the same constituent members which have the same names and functions. On this account, details of the same constituent members will not be repeatedly described.

FIG. 1 schematically illustrates an example of an overall configuration of a display processing system in accordance with an embodiment of the present invention. A display processing system 1 includes a multifunction peripheral (hereinafter, referred to as "MFP") 100 and a PC 200 which are both connected to a network 7 (see FIG. 1). The MFP 100 exemplifies an image forming apparatus which has a plurality of functions such as a scanning function, a copying function, a facsimile function, and a printing function.

The network 7 is a local area network (LAN), which is connected either by wireline or wireless. Note, however, that the network 7 is not limited to the LAN. The network 7 can therefore be a network such as a wide area network (WAN) or a public switched telephone network (PSTN). The network 7 is connected to the Internet 3 via a gateway, so that the MFP 100 and the PC 200 can communicate with a server 5 which is connected to the Internet 3.

The PC 200 is a general personal computer in which an application program for enabling the PC 200 to communicate with the MFP 100 is installed.

The MFP 100 can execute a browsing program and has a browsing function. In a case where, for example, a URL of a web page stored in the server 5 is specified by a user, the MFP 100 (i) requests the server 5 to send the web page identified by the URL, (ii) receives the web page from the server 5, and then (iii) displays the web page.

The server 5 of the present embodiment is a server owned and managed by (i) a leasing company which leases the MFP 100 to the user, (ii) a dealer which has sold the MFP 100, or (iii) a manufacturer of the MFP 100. The server 5 stores various kinds of information regarding image forming apparatuses. Such various kinds of information include at least environmental information pertinent to the MFP 100.

Note that the server 5 can be a server owned and managed by a cloud provider (i.e., a provider specialized in providing a cloud computing service).

The environmental information indicates that a product has been produced by taking into consideration environmental friendliness. There are many kinds of environmental information as early described, and the number of the kinds of environmental information will continue to increase.

Specifically, there are pieces of environmental information as follows:

Information indicating that a product conforms to the Law on Promoting Green Purchasing;

Information indicating that a product is conducive to environmental preservation because the product has been produced, by taking into consideration various effects on environment over entire life cycle;

Information indicating that a product is under the guideline of Green Purchasing Network and is registered in the database;

Information indicating that an office equipment such as a personal computer has a power consumption, during standby, which falls within a predetermined reference power consumption;

Information indicative of a degree to which the energy saving standard is met under the Energy Saving Law;

Information indicating that the impact on the environment is considered ranging from design of a computer or a display to recycling/reusing of the computer or the display;

Information indicating that a product is produced by using thinned wood;

Information indicative of a blending ratio of waste paper in paper/paper product, etc.;

Information indicative of (i) diffusion of the use of paper product made of waste paper and (ii) environmental protection;

Information indicating that a product is a paper product produced by using non-wood pulp;

Information indicating that a commercial product is made from non-wood pulp;

Information indicating that a commercial product is made from recycled PET bottles.

Information indicating that a product is made of a wood material which has been legally logged from properly-managed woods.

Information indicative of influence of human activity on global warming by numerically expressing carbon dioxide emission; and Information indicating that (i) a product has functions similar to other products, (ii) environmental protection has been considered from many angles, (iii) the product is an environmentally friendly, and (iv) there is no problem of use and safety.

Note that the environmental information is not limited to those listed above, and therefore can be any information, provided that a product is certified as an environmentally friendly product by an institution such as the Ministry of Economy, Trade and Industry, the Ministry of the Environment, or an environmental conservation group.

The MFP 100 is to store or has already stored (i) mark/label images which are images of marks and/or labels of pieces of environmental information pertinent to the MFP 100, out of existing plural kinds of environmental information, and (ii) environmental information names (names and text strings of kinds of marks and/or labels of environmental information pertinent to the MFP 100).

Figure 2:
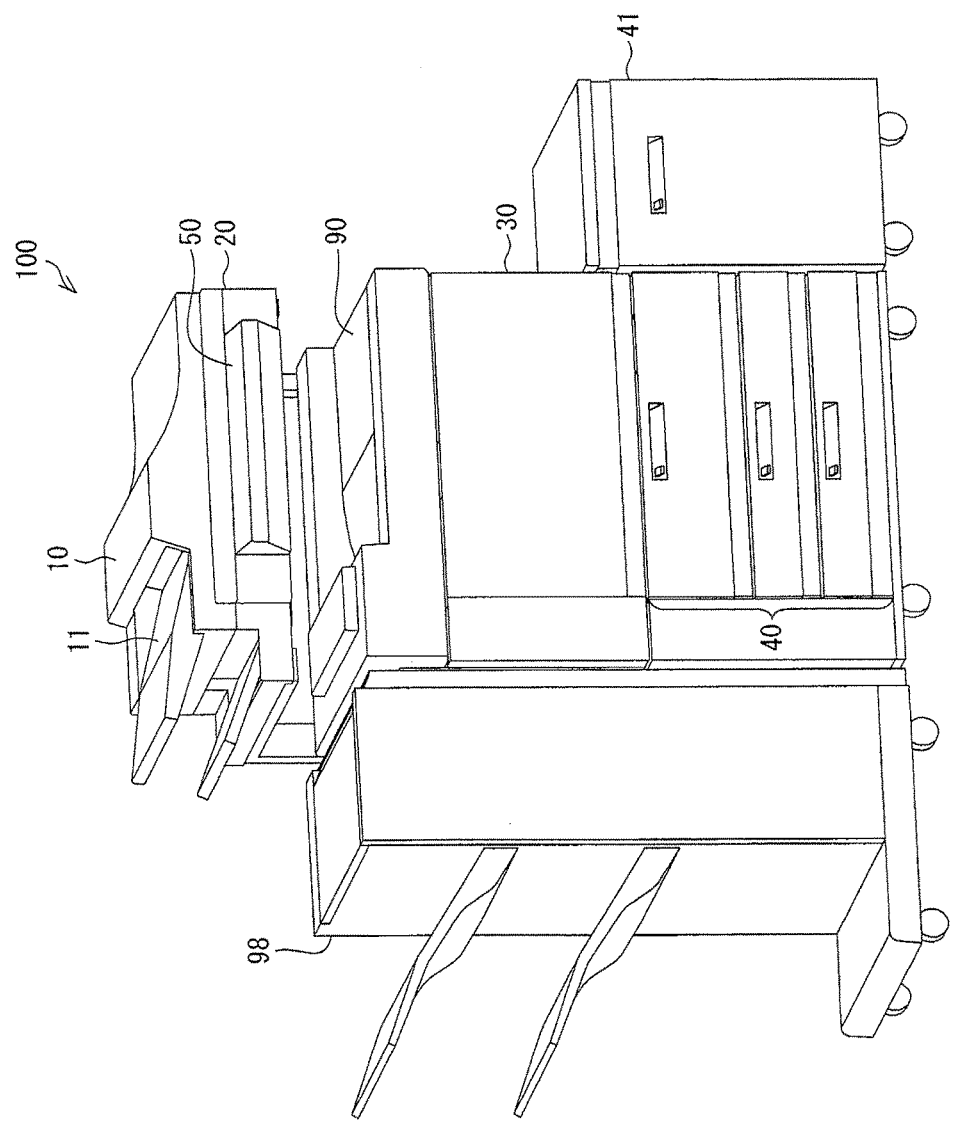
FIG. 2 is a perspective view illustrating an overview of an MFP.

FIG. 2 is a perspective view illustrating an overview of the MFP 100. The MFP 100 includes an automatic document feeder (ADF) 10, a document reading section 20, an image forming section 30, and a paper feeding section 40 (see FIG. 2).

The ADF 10 carries, one by one, a plurality of documents, which are placed on a document tray 11, to a predetermined document reading position of the document reading section 20. The ADF 10 discharges a document, which has been read by the document reading section 20, to a paper output tray.

The document reading section 20, which reads a document image in accordance with a size of the document, includes (i) a light source which emits light to the document carried to the document reading position and (ii) a photodetector which receives light reflected from the document. The photodetector converts received light into image data, which is an electric signal, and supplies the image data to an image processing section (not illustrated).

The image processing section carries out various kinds of data processing, such as a shading correction, with respect to the image data supplied from the document reading section 20. After that, the image processing section supplies, to the image forming section 30, the image data which has been subjected to the various kinds of data processing. The paper feeding section 40 feeds, toward the image forming section 30, a sheet which is placed on a paper feeding tray or is stored in a large capacity container 41.

The image forming section 30 forms an image on the sheet fed by the paper feeding section 40, in accordance with the imaged data which has been subjected to the various kinds of data processing. Then, the image forming section 30 discharges the sheet, on which the image has been formed, either on a paper output tray 90 or via a post-processing device 98.

Figure 3:
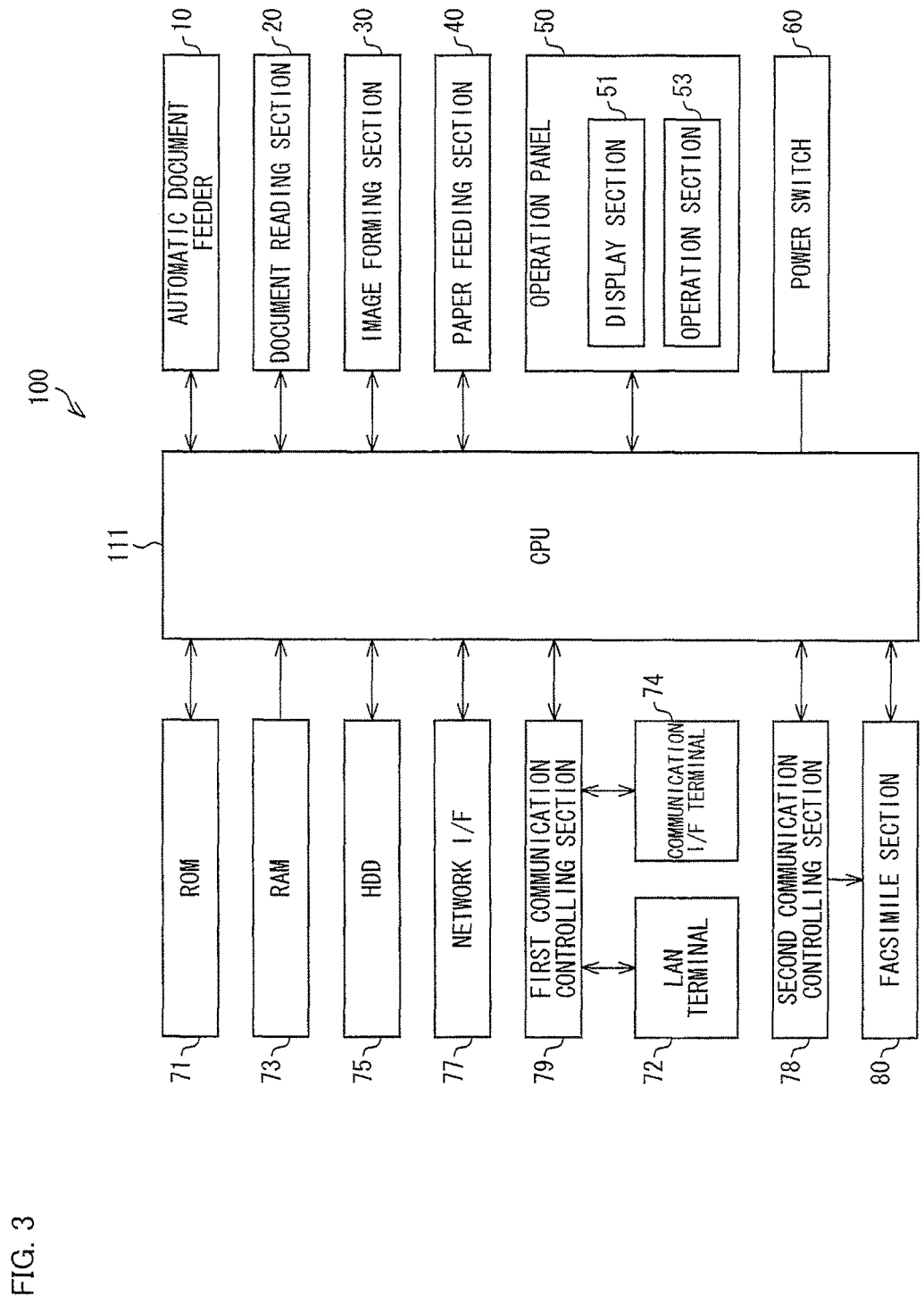
FIG. 3 is a block diagram illustrating an example of a configuration of an MFP.

FIG. 3 is a block diagram illustrating an example of a configuration of the MFP 100. The MFP 100 includes (i) a CPU 111, (ii) an ROM 71 in which data such as programs executed by the CPU 111 is stored, (iii) an RAM 73 which serves as a work area of the CPU 111, and (iv) a hard disk drive (HDD) 75 which serves as a large capacity storage (see FIG. 3). The CPU 111 executes the programs stored in the ROM 71 so that the MFP 100 carries out various kinds of processes.

A storage medium for storing data such as the programs executed by the CPU 111 can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

CPU 111 is connected with the ADF 10, the document reading section 20, the image forming section 30, the paper feeding section 40, an operation panel 50, a power switch 60, a network I/F 77, a first communication controlling section 79, a second communication controlling section 78, and a facsimile section 80. The CPU 111 totally controls the MFP 100.

The power switch 60 is provided in the MFP 100 and is operated by a user.

The network I/F 77 serves as an interface via which the MFP 100 is connected with the network 7. The CPU 111 can communicate, via the network 7, with an external device (here, the PC 200) which is connected with the network 7 (see FIG. 1).

The first communication controlling section 79 has (i) a LAN terminal 72 which serves as an interface used in a communication made based on a communication protocol and (ii) a communication I/F terminal 74 via which a serial communication is made. In response to an instruction from the CPU 111, the first communication controlling section 79 transmits data to or receives data from an external device which is connected to the LAN terminal 72 or the communication I/F terminal 74.

In a case where a cable is connected to the LAN terminal 72 so as to be connected with the Internet 3, the first communication controlling section 79 communicates with the server 5 via the LAN terminal 72.

The CPU 111 (i) controls the first communication controlling section 79 to download environmental information, which is identified by the MFP 100, from the server 5 connected to the Internet 3 and then (ii) controls the HDD 75 to store the environmental information. This allows the environmental information to be updated.

A memory card, which contains a flash memory, can be connected to the communication I/F terminal 74. The CPU 111 (i) controls the first communication controlling section 79 to read out a program, which is to be executed by the CPU 111, from the memory card and then (ii) controls the HDD 75 to store the program. This allows the program to be updated. Examples of the program encompass a screen display program (later described).

Note that a storage medium for storing the program, which is to be executed by the CPU 111, is not limited to the memory card, and therefore can be a medium such as a flexible disk, an optical disk, an IC card, an optical memory card, or a semiconductor memory such as a mask ROM or an EEPROM.

The second communication controlling section 78 is a modem via which the CPU 111 is connected with the PSTN. A telephone number of the PSTN is assigned to the MFP 100 in advance. In a case where a facsimile device, which is connected to the PSTN, calls the telephone number assigned to the MFP 100, the MFP 100 controls the facsimile section 80 to communicate with the facsimile device.

The facsimile section 80 is connected with the PSTN so as to transmit facsimile data via the PSTN or to receive facsimile data via the PSTN.

The operation panel 50 includes a display section 51 and an operation section 53. The display section 51 is a display device such as a liquid crystal display device (LCD), an organic ELD (electro luminescence display), a display such as an electronic paper utilizing electrophoresis, a plasma display (PDP), a plasma tube array display (PTAD), or a display (FED, SED) utilizing an electron emitting element. The display section 51 displays (i) a screen, such as a setting screen showing an instruction menu to the user, (ii) a screen showing information regarding obtained image data, and/or (iii) a screen showing environmental information.

The operation section 53 has a plurality of keys from which data, such as various instructions, letters, and numerals, is entered by the user. The plurality of keys of the operation section 53 are hard keys each of which serves as a switch. Note that the operation section 53 can include a touch panel as a part of the plurality of keys. Alternatively, the operation section 53 can be merely configured by the touch panel. In a case where the operation section 53 includes the touch panel or is merely configured by the touch panel, the touch panel is provided on the display section 51. The operation section 53 of the present embodiment is assumed to have a touch panel. Note that, alternatively, a gesture input using a finger-wearable interface can be used.

Figure 4:
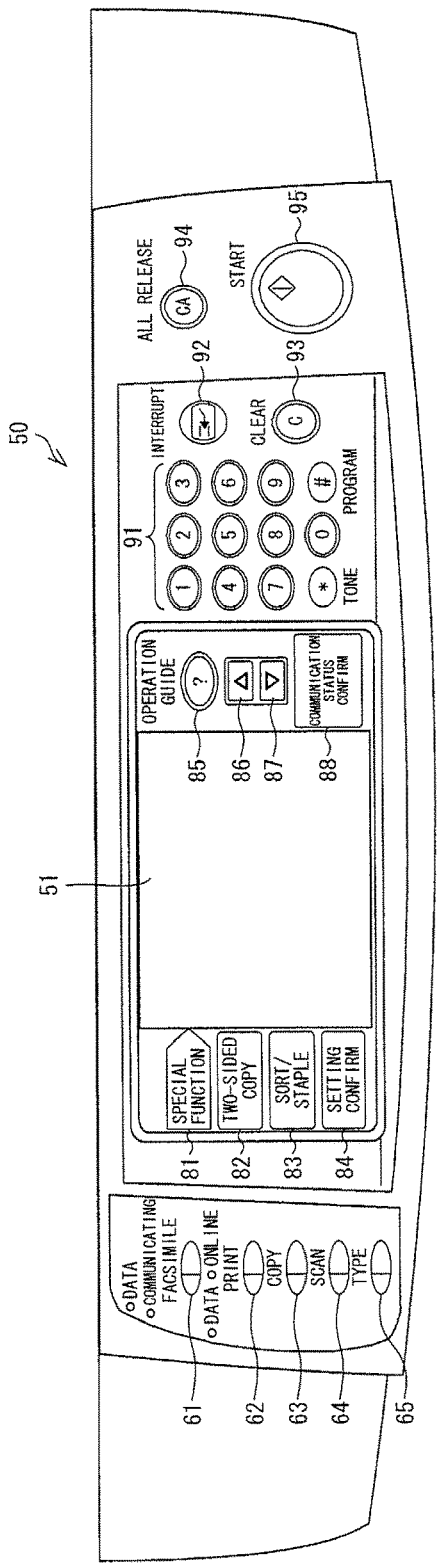
FIG. 4 illustrates an example of an operation panel.

FIG. 4 illustrates an example of an operation panel. The operation panel 50 includes the display section 51 and the operation section 53 (see FIG. 4). The operation section 53 has a facsimile key 61 for causing a transition of the MFP 100 to a facsimile mode in which sending/receiving of facsimile is carried out, a print key 62 for causing a transition of the MFP 100 to a print mode in which a printing process is carried out, a copy key 63 for causing a transition of the MFP 100 to a copy mode in which a copying process is carried out, a scan key 64 for causing a transition of the MFP 100 to a scan mode in which a scanning process is carried out, a typing key 65 for causing a transition of the MFP 100 to a typing mode in which a typing process is carried out, a special function key 81, a two-sided copy key 82, a sort/staple key 83, a setting confirm key 84, an operation guide key 85, an up key 86 from which an instruction on moving upward a cursor which is displayed on the display section 51, a down key 87 from which an instruction on moving downward the cursor which is displayed on the display section 51, a communication status confirm key 88, a numeric keypad 91, an interrupt key 92, a clear key 93 for canceling an entered instruction, an all release key 94, and a start key 95.

Figure 5:
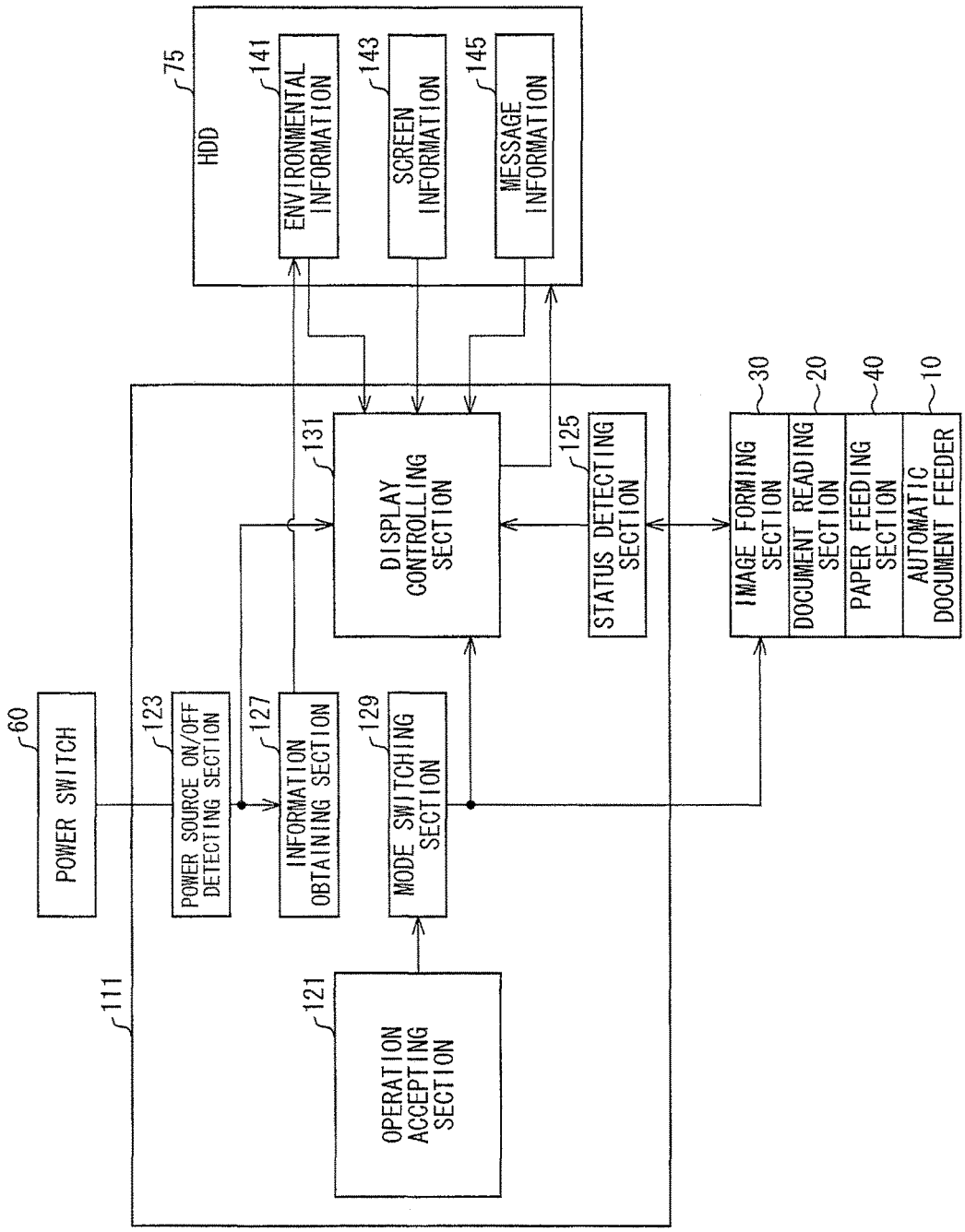
FIG. 5 is a functional block diagram illustrating (i) overall functional configurations of a CPU included in an MFP and (ii) data stored in an HDD.

FIG. 5 is a functional block diagram schematically illustrating functions of the CPU 111 and pieces of data stored in the HDD 75, in the MFP 100. The CPU 111 includes a power source ON/OFF detecting section 123, an operation accepting section (operation accepting means) 121, a mode switching section 129, a status detecting section 125, an information obtaining section 127, and a display controlling section (display controlling means) 131 (see FIG. 5).

The HDD 75 stores at least screen information 143 and message information 145 in advance. The screen information 143 is plural pieces of information each indicative of a corresponding one of screens which prompts the user to enter a corresponding one of instructions. Examples of the plurality of screens encompass at least an initial screen (setting screen) (later described). From the initial screen, instructions on a plurality of processes (jobs), which are to be carried out by the MFP 100, are entered. The message information 145 includes plural pieces of information each indicative of a corresponding one of messages, each of which indicates a corresponding one of states of the MFP 100. Examples of the messages encompass at least a message "now processing", a message "please wait for a while", a message "now warming up", and a message "deleting data".

The power source ON/OFF detecting section 123 detects whether the power switch 60 is turned ON or OFF. When the power source ON/OFF detecting section 123 detects the power switch 60 being turned ON, the power source ON/OFF detecting section 123 supplies a power source ON signal, which indicates that the power source has been turned ON, to the display controlling section 131 and the information obtaining section 127. When the power source ON/OFF detecting section 123 detects the power switch 60 being turned OFF, the power source ON/OFF detecting section 123 supplies a power source OFF signal, which indicates that the power source has been turned OFF, to the display controlling section 131 and the information obtaining section 127.

When the power switch 60 is turned ON, the MFP 100 starts a warm-up operation for causing the entire MFP 100 including the image forming section 30 to be ready for carrying out an image forming operation. During the warm-up operation, (i) a fixing section (not illustrated) included in the image forming section 30 is increased in temperature so as to have a predetermined temperature which causes a toner image to be fixed on a sheet, (ii) a process controlling operation is carried out so as to adjust an image density, and (iii) other processes are carried out. When the power switch 60 is turned OFF, the MFP 100 carries out a termination process for terminating the operation of the MFP 100, and then the MFP 100 is turned OFF.

The information obtaining section 127 obtains environmental information via the network 7. When the information obtaining section 127 receives the power source ON signal from the power source ON/OFF detecting section 123, the information obtaining section 127 requests, via the first communication controlling section 79 and the LAN terminal 72 (see FIG. 3), the server 5 (see FIG. 1) to send environmental information pertinent to the MFP 100. When the server 5 is requested, by the MFP 100, to send the environmental information, the server 5 sends, to the MFP 100, environmental information which has been identified by device identification information of the MFP 100, and then the information obtaining section 127 receives the environmental information from the server 5 via the LAN terminal 72 and the first communication controlling section 79. The environmental information, which has been received by the information obtaining section 127, is stored in the HDD 75. As such, latest environmental information 141 is to be stored in the HDD 75 of the MFP 100 in accordance with the present embodiment, every time the power switch 60 is turned ON.

The environmental information 141 includes, as early described, (i) the mark/label images, which are images of marks and/or labels of respective pieces of environmental information pertinent to the MFP 100 and (ii) the environmental information names (names and text strings of kinds of the marks and/or labels of the environmental information pertinent to the MFP 100).

FIG. 6 illustrates an example table in which pieces of environmental information 141 are stored. In the example table illustrated in FIG. 6, a name and a mark/label image of each of the pieces of environment information are stored so as to be associated with a corresponding one of serial numbers. The example table illustrated in FIG. 6 stores a mark of a product which is conformity with the Law on Promoting Green Purchasing; an Eco Mark (registered trademark); a mark of a product registered in the GPN database; a mark of an International Energy Star Program (registered trademark); a carbon footprint label; a Nordic Environmental Label (registered trademark); a blue angel label; an EURoHS Directive-compliant label; an Eco-Leaf Environmental label, and the like. Note that the serial numbers determine an order in which the pieces of environmental information are displayed. It is therefore possible to change the order in which the pieces of environmental information are displayed, in accordance with how the serial numbers are associated with the pieces of environmental information. Note that, (i) in the mark of a product which is conformity with the Law on Promoting Green Purchasing, the middle part reads "Law on Promoting Green Purchasing" and the lower part reads "Conforming Product", in Japanese, (ii) in the Eco Mark, the upper part reads "Earth-friendly" in Japanese, (iii) the mark of a product registered in the GPN database reads "Registered Product in the GPN Database" in Japanese, and, (iv) in the Eco-Leaf Environmental label, the lower part reads "Product Environmental Information" in Japanese.

The operation accepting section 121 (see FIG. 5) accepts instructions entered by operations of the user from the operation section 53. The operations include, for example, an operation in which the user instructs the various kinds of keys (operation keys) of the operation section 53 and an operation in which the user instructs the touch panel provided on the display section 51. When the operation accepting section 121 accepts an instruction input from the operation section 53, the operation accepting section 121 sends the instruction input to the mode switching section 129 and the display controlling section 131.

The mode switching section 129 switches, in accordance with a usage state of the MFP 100, a mode of the MFP 100 to the energy saving mode or a normal mode in which the MFP 100 is ready for carrying out operation. In the normal mode, since electric power is applied to the entire MFP 100, the MFP 100 is ready for promptly carrying out, in response to the user pressing the start key 95, a function (such as a scanning function, a copying function, a facsimile function, a mail function, or a printing function) which has been selected by the user. On the other hand, in the energy saving mode, since the MFP 100 consumes electric power less in the energy saving mode than in the normal mode, the electric power is applied to only a part of the MFP 100 such as the operation section 53, the HDD 75, the network I/F 77, the first communication controlling section 79, the second communication controlling section 78, and the CPU 111. When the start key 95 is pressed by the user during the energy saving mode, the MFP 100 first carries out an operation (returning operation) for returning to the normal mode. The returning operation includes a process for causing the fixing section (not illustrated) of the image forming section 30, whose temperature has been decreased, to increase in temperature so as to have a predetermined temperature which allows a toner image to be fixed on a sheet.

While the MFP 100 is in the normal mode, the mode switching section 129 measures a time period during which the MFP 100 is not in operation (i.e., a time period during which the MFP 100 is left unused). When a predetermined time period T1 has elapsed since the MFP 100 was left unused, the mode switching section 129 switches the mode of the MFP 100 from the normal mode to the energy saving mode. On the other hand, while the MFP 100 is in the energy saving mode, the mode switching section 129 switches the mode of the MFP 100 from the energy saving mode to the normal mode when the operation accepting section 121 accepts an instruction input from the operation section 53. Note that the mode switching section 129 switches the mode of the MFP 100 from the energy saving mode to the normal mode, when the MFP 100 is instructed, by the external PC 200, to carry out printing or faxing.

When the mode switching section 129 has switched the mode of the MFP 100, the mode switching section 129 sends a mode switched signal, which indicates that the mode has been switched from the normal mode to the energy saving mode or vice versa, to the sections of the MFP 100 such as the image forming section 30, the document reading section 20, the automatic document feeder 10, the paper feeding section 40, and the display controlling section 131.

Note that, according to the description above, the mode switching section 129 switches the mode of the MFP 100 from the energy saving mode to the normal mode when the operation accepting section 121 accepts an instruction input from the operation section 53. However, the switching of the mode to the normal mode is not limited to this. For example, an open/close sensor, which detects opening/closing of a platen cover, can be provided to the MFP 100 so that the energy saving mode can be switched to the normal mode when the open/close sensor detects the opening of the platen cover. Alternatively, the energy saving mode can be switched to the normal mode when a document detecting sensor detects a document being placed on the document tray 11.

The status detecting section 125 detects states of the respective sections of the MFP 100 such as the image forming section 30, the document reading section 20, the automatic document feeder 10, and the paper feeding section 40 so as to determine whether or not a process of a selected function can be carried out. Specifically, in a case where a selected function is the copying function or the printing function, the status detecting section 125 detects whether or not the image forming section 30 is ready for an image formation. The state "ready for an image formation" means, specifically, that the fixing section of the image forming section 30 has been increased in temperature so as to have a sufficient predetermined temperature which allows a toner image to be fixed on a sheet. In a case where a selected function is the facsimile function or the scanning function, the status detecting section 125 detects whether or not the document reading section 20 is ready for an image reading.

The status detecting section 125 supplies an operable signal to the display controlling section 131 in a case where the status detecting section 125 detects a state in which the image forming section 30 is ready for the image formation or a state in which the document reading section 20 is ready for the image reading, when the power switch 60 is turned ON or when the energy saving mode is switched to the normal mode.

The display controlling section 131 controls the display section 51 to display various kinds of information in accordance with (i) a power source ON signal or a power source OFF signal supplied from the power source ON/OFF detecting section 123 and (ii) the mode switched signal supplied from the mode switching section 129.

When the display controlling section 131 receives a power source ON signal from the power source ON/OFF detecting section 123, the display controlling section 131 controls the display section 51 to display a screen showing (i) the environmental information and (ii) message information indicating that the MFP 100 is in the warm-up operation. Hereinafter, such a screen is referred to as "warm-up operation screen". Specifically, in a case where a piece of environmental information (i.e., environmental information 141) is set, in advance, to be displayed in a thumbnail view, the warm-up operation screen includes a display of a mark/label image. In a case where the piece of environmental information is set, in advance, to be displayed in a list view, the warm-up operation screen includes a name of the piece of environmental information. In a case where plural mark/label images are to be displayed in a thumbnail view, the warm-up operation screen includes thumbnails of respective plural mark/label images. In a case where plural pieces of environmental information are to be displayed in a list view, the warm-up operation screen includes a list of the names of the respective plural pieces of environmental information. The warm-up operation screen further includes a message, which indicates that the MFP 100 is in the warm-up operation, out of the plurality of messages included in the message information 145.

Figure 7:
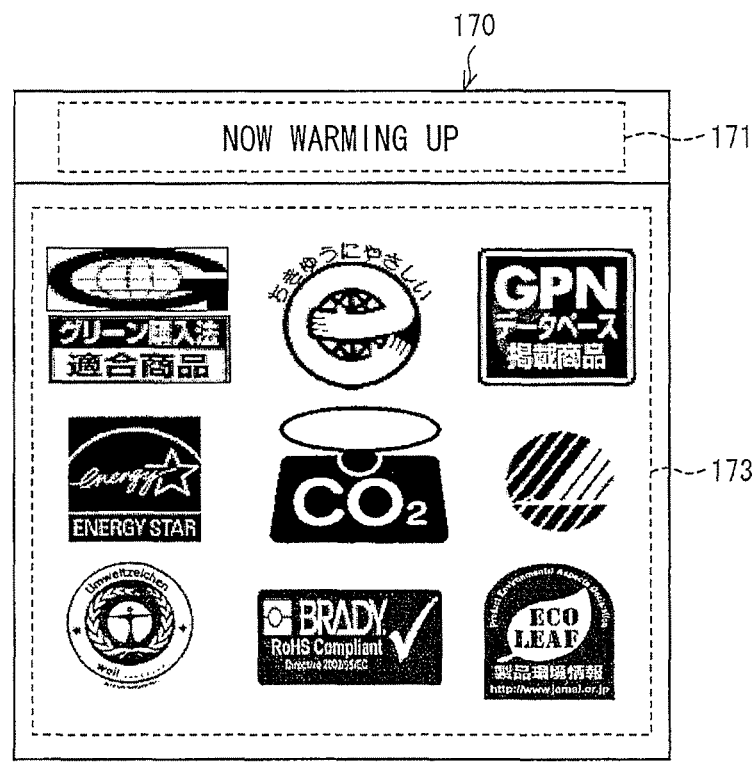
FIG. 7 illustrates a first example of a warm-up operation screen.
Figure 8:
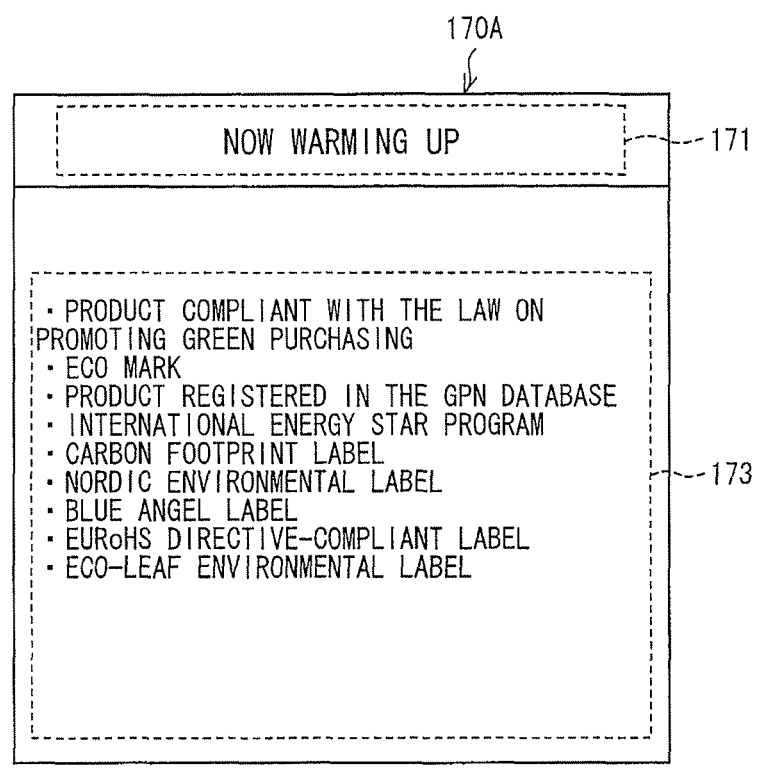
FIG. 8 illustrates a second example of a warm-up operation screen.

FIG. 7 illustrates a first example of the warm-up operation screen. FIG. 8 illustrates a second example of the warm-up operation screen. Each of a warm-up operation screen 170 (see FIG. 7) and a warm-up operation screen 170A (see FIG. 8) has a message display area 171 and an environmental information display area 173. In the message display area 171, the message information 145 is displayed. In each of the first and second examples, the message "now warming up" is displayed as information indicating that the MFP 100 is in the warm-up operation. In the environmental information display area 173, the environmental information 141 is displayed. In a case where plural mark/label images are set, in advance, to be displayed, the mark/label images of the respective plural pieces of environmental information are displayed, in the environmental information display area 173, in the thumbnail view (see FIG. 7). In a case where plural names of plural pieces of environmental information are set, in advance, to be displayed, a list of the names of the respective plural pieces of environmental information are displayed in the environmental information display area 173 (see FIG. 8).

Each of the warm-up operation screens 170 and 170A, which shows that the MFP 100 is in the warm-up operation, is displayed when the power switch 60 of the MFP 100 is turned ON by the user. With the configuration, it is possible to let the user know, via the warm-up operation screen 170 or 170A, about how the MFP 100 has been manufactured with due considerations to what environmental particulars, while the user is waiting for a completion of the warm-up operation because the user cannot enter any instruction from the operation panel due to the fact that the MFP 100 is in the warm-up operation.

Furthermore, the environmental information display area 173 can be secured larger than the message display area 171. This is because (i) only a message such as "now warming up" is displayed on each of the warm-up operation screens 170 and 170A and (ii) each of the warm-up operation screens 170 and 170A is not a setting screen from which an instruction is to be entered. It is therefore possible to effectively call attention to the user.

The environmental information is thus disclosed to the user, by use of the display section 51, at timing at which the user is not hindered from using the MFP 100. As such, it is thus possible to call attention to the user as to the fact that the MFP 100 has been manufactured with due considerations to environment.

Note that, according to the present embodiment, the environmental information 141 is displayed together with the message indicating that the MFP 100 is in the warm-up operation. However, the present embodiment is not limited to this. It is therefore possible to provide (i) a first screen which shows the message indicating that an MFP 100 is in a warm-up operation and (ii) a second screen which shows environmental information 141 so that the first and second screens are alternately displayed by the display section 51.

When the power switch 60 is turned ON, the display controlling section 131 (see FIG. 5) controls the display section 51 to display the warm-up operation screen 170 or 170A, depending on a display mode which is set in advance. The following describes, as an example, a case where the warm-up operation screen 170 is displayed. When the display controlling section 131 receives an operable signal from the status detecting section 125 while the warm-up operation screen 170 is being displayed, the display controlling section 131 controls the display section 51 (i) to terminate the display of the warm-up operation screen 170 and (ii) to instead display the initial screen. From the initial screen, the MFP 100 accepts instructions on the plurality of processes which can be carried out by the MFP 100. For example, the MFP 100 can accept, from the initial screen, an instruction on a process such as the faxing, the copying, or the scanning. The initial screen includes an eco-view button (eco-view icon). The eco-view button is associated with an instruction on displaying environmental information.

Figure 9:
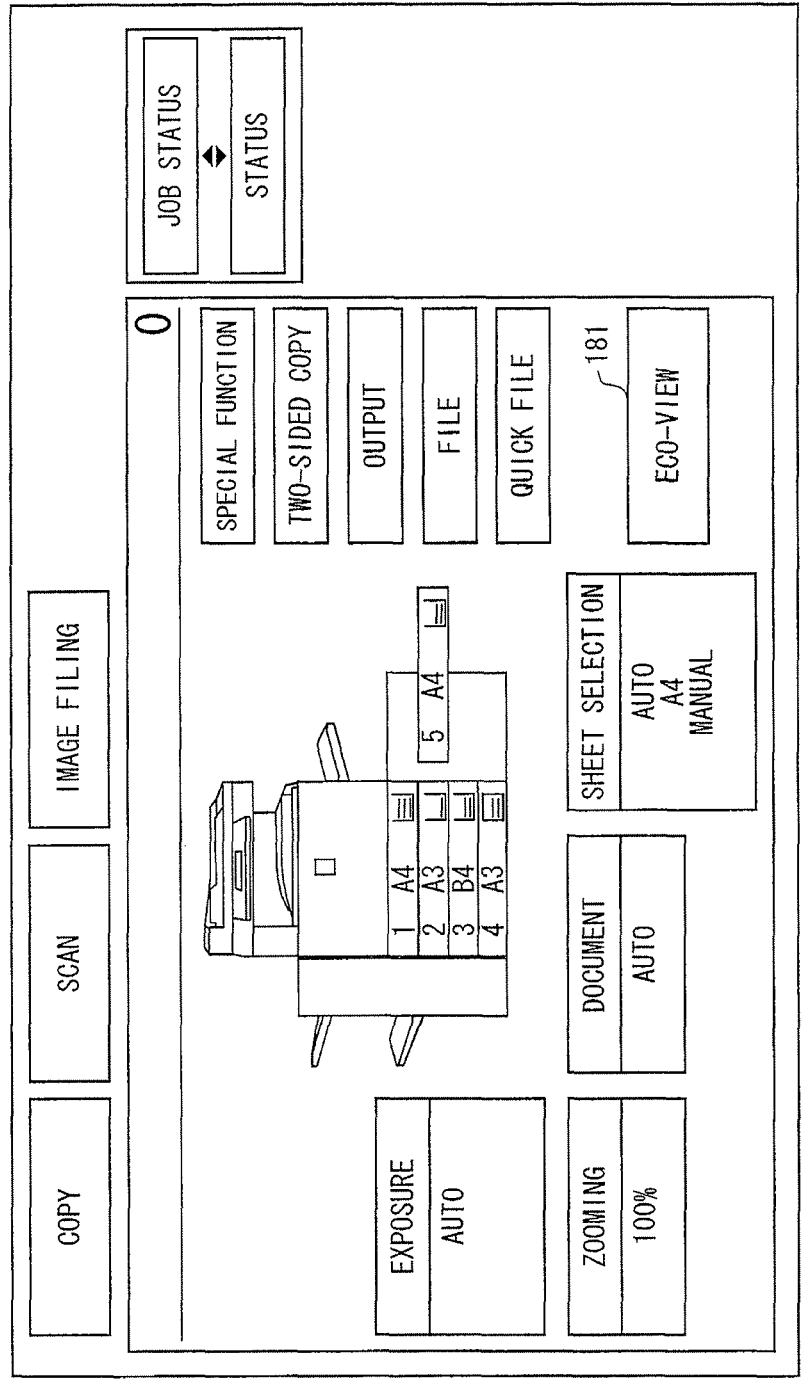
FIG. 9 illustrates an example of an initial screen.

FIG. 9 illustrates an example of the initial screen. An initial screen 180 includes an eco-view button 181 as one of a plurality of buttons from which instructions, on the respective plurality of processes that can be carried out by the MFP 100, are entered (see FIG. 9). The eco-view button 181 is designated by a text string "ECO-VIEW". When the user presses the eco-view button 181, a display mode selection screen is displayed.

Specifically, when (i) the user presses the eco-view button 181 on the initial screen 180 and (ii) the operation accepting section 121 accepts an instruction on displaying environmental information, the instruction is sent to the display controlling section 131. The display controlling section 131 controls the display section 51 to display the display mode selection screen when the display controlling section 131 receives, from the operation accepting section 121, the instruction on displaying the environmental information. The display mode selection screen prompts the user to select how to display the environmental information. Specifically, the display mode selection screen prompts the user to select a thumbnail view of mark/label images or a list view of environmental information names.

Figure 10:
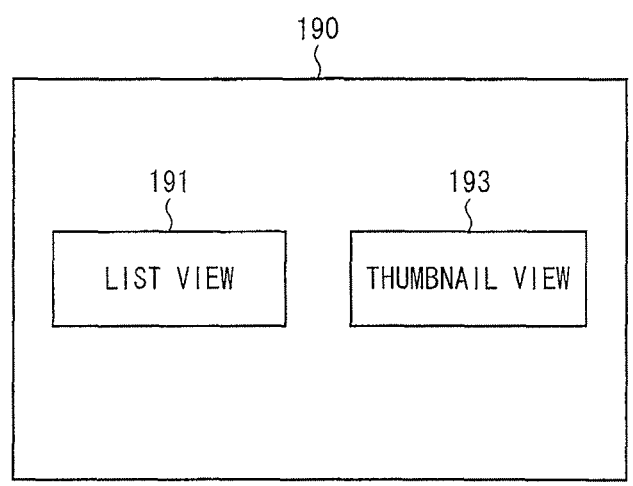
FIG. 10 illustrates an example of a display mode selection screen.

FIG. 10 illustrates an example of the display mode selection screen. A display mode selection screen 190 includes a first button 191 and a second button 193 (see FIG. 10). The first button 191 is designated by a text string "LIST VIEW", and the second button 193 is designated by a text string "THUMBNAIL VIEW". The first button 191 or the second button 193 is exclusively selected by the user. When the user selects the first button 191 or the second button 193, an environmental information display screen is displayed in accordance with a selected display mode.

Specifically, when the user presses the second button 193 (for the thumbnail view) or the first button 191 (for the list view) on the display mode selection screen 190 so as to enter an instruction on selecting a display mode of environmental information, the operation accepting section 121 accepts the instruction and then sends the instruction to the display controlling section 131. Upon receipt of the instruction from the operation accepting section 121, the display controlling section 131 extracts environmental information 141 from the HDD 75, and then controls the display section 51 to display an environmental information display screen in accordance with the environmental information 141. In a case where the display controlling section 131 receives, from the operation accepting section 121, an instruction on displaying the environmental information in the thumbnail view, the environmental information display screen includes thumbnails of the respective mark/label images. In a case where the display controlling section 131 receives, from the operation accepting section 121, an instruction on displaying the environmental information in the list view, the environmental information display screen includes a list of names of the plural pieces of environmental information. Specifically, the environmental information display screen, including the thumbnails of the respective mark/label images, is the screen including the environmental information display area 173 of the warm-up operation screen 170 (see FIG. 7). The environmental information display screen, including the list of the names of the pieces of environmental information, is the screen including the environmental information display area 173 of the warm-up operation screen 170A (see FIG. 8).

As such, the environmental information display screen is displayed when the eco-view button 181 on the initial screen 180 is pressed by the user. This allows the user to confirm the environmental information at any desired timing.

Upon receiving an instruction on displaying the environmental information from the operation accepting section 121, the display controlling section 131 starts timing after the reception of the instruction. Then, the display controlling section 131 judges whether or not a predetermined period of time T2 has elapsed since the reception of the instruction. Until the predetermined period of time T2 has elapsed since the reception of the instruction, the display controlling section 131 controls the display section 51 to keep displaying the environmental information display screen. When the display controlling section 131 judges that the predetermined period of time T2 has elapsed since the reception of the instruction, the display controlling section 131 controls the display section 51 (i) to terminate the display of the environmental information display screen and (ii) to instead display the initial screen. As such, in a case where the environmental information display screen is displayed in response to an instruction entered by the user, the display of the environmental information display screen is automatically terminated and the initial screen is displayed instead, when the predetermined period of time T2 has elapsed since the display controlling section 131 received from the operation accepting section 121, the instruction on displaying the environmental information. It is therefore possible to relieve the user of the bother of the operation of returning to the initial screen.

Note that the display of the environmental information display screen can be terminated when the user enters, from the operation section 53, an instruction on returning to a previous screen.

When the display controlling section 131 receives, from the mode switching section 129, a mode switched signal indicating that the MFP 100 has been switched from the energy saving mode to the normal mode, the display controlling section 131 controls the display section 51 to display a returning screen which shows (i) the environmental information and (ii) the message information indicating that the MFP 100 is in the returning operation.

When an instruction on switching the energy saving mode to the normal mode is entered, the returning screen shows (i) the message information indicating that the MFP 100 is in the returning operation and (ii) the environmental information indicating that the MFP 100 is an environmentally friendly product.

The returning screen includes (i) thumbnails of respective mark/label images in a case where the display mode has been set to the thumbnail view in advance and (ii) a list of names of the pieces of environmental information in a case where the display mode has been set to the list view in advance. The returning screen further includes a message, which indicates that the MFP 100 is in the returning operation, out of the plurality of messages included in the message information 145. The message indicating that the MFP 100 is in the returning operation is, for example, a massage "please wait for a while".

Note that, according to the present embodiment, the environmental information 141 is displayed together with the message indicating that the MFP 100 is in the returning operation. However, the present embodiment is not limited to this. It is therefore possible to provide (i) a first screen which shows the message indicating that an MFP 100 is in the returning operation and (ii) a second screen which shows environmental information 141 so that the first and second screens are alternately displayed by the display section 51.

While the MFP 100 is in the normal mode, the display controlling section 131 judges whether or not an operable signal is supplied from the status detecting section 125. Until the display controlling section 131 receives the operable signal from the status detecting section 125, the display controlling section 131 controls the display section 51 to keep displaying the returning screen. When the display controlling section 131 receives the operable signal from the status detecting section 125, the display controlling section 131 controls the display section 51 (i) to terminate the display of the returning screen and (ii) to instead display the initial screen 180.

The returning screen, which shows that the MFP 100 is in the returning operation, is displayed when the MFP 100 is switched from the energy saving mode to the normal mode. With the configuration, it is possible to let the user know, via the returning screen, about how the MFP 100 has been manufactured with due considerations to what environmental particulars, while the user is waiting for a completion of the returning operation because the user cannot enter any instruction from the operation panel due to the fact that the MFP 100 is in the returning operation.

In the returning screen, an environmental information display area, in which the thumbnails of the respective mark/label images or the list of names of the plural pieces of environmental information is displayed, can be secured larger than a message display area in which a message is to be displayed. This is because (i) only a message such as "please wait for a while" is displayed on the message display area and (ii) the returning screen is not a setting screen from which an instruction is to be entered. It is therefore possible to effectively call attention to the user.

The environmental information is thus disclosed to the user, by use of the display section 51, at timing at which the user is not hindered from using the MFP 100. As such, it is thus possible to call attention to the user as to the fact that the MFP 100 has been manufactured with due considerations to environment.

Figure 11:
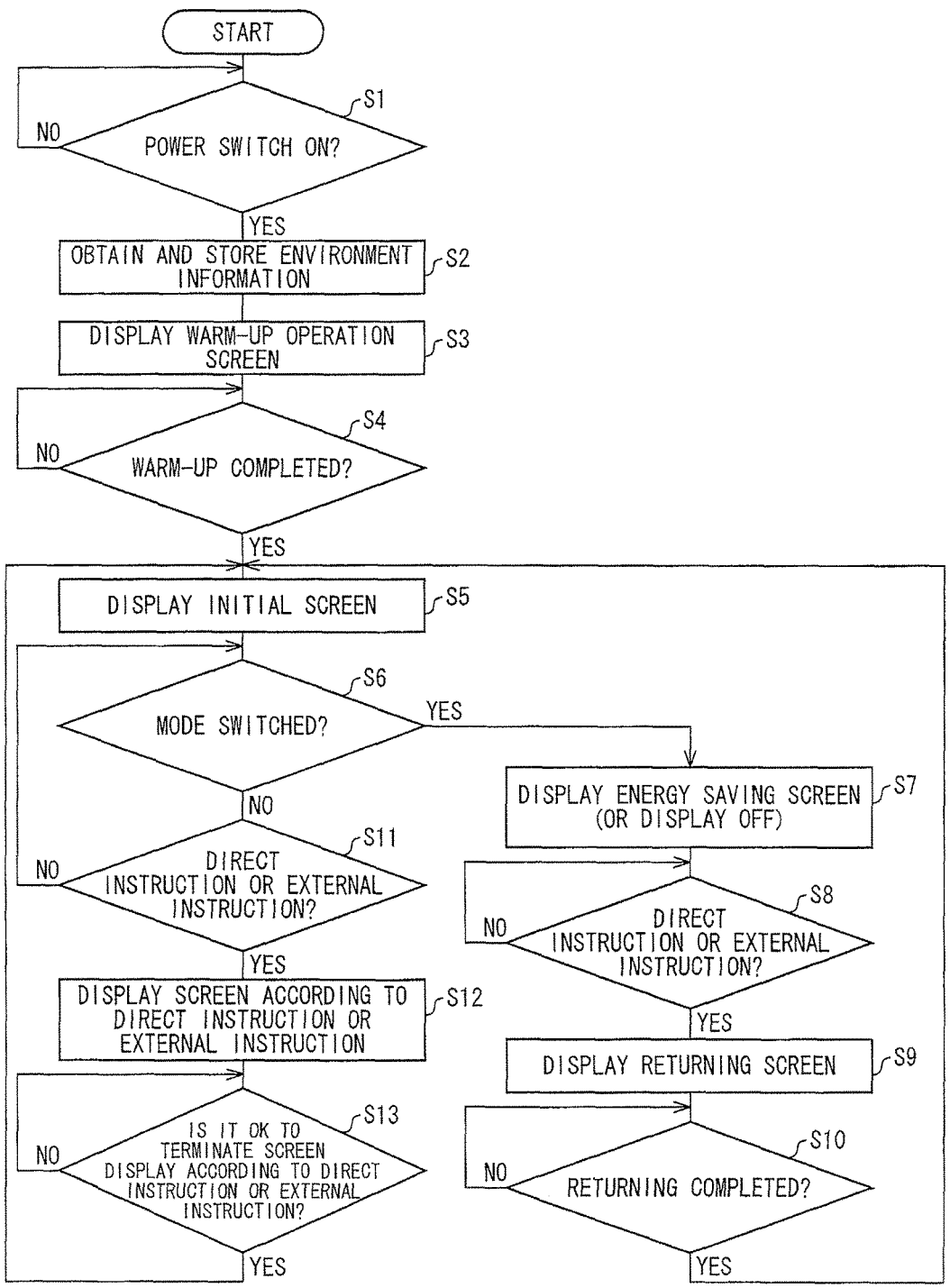
FIG. 11 is a flowchart illustrating an example of a flow of a screen displaying process.

FIG. 11 is a flowchart illustrating an example of a flow of a screen displaying process. The screen displaying process is carried out by the CPU 111, by causing the CPU 111 to execute the screen display program stored in the ROM 71 or the HDD 75. When the CPU 111 detects the power switch 60 being turned ON (YES in a step S1), the process proceeds to a step S2 (see FIG. 11). When the power switch 60 is turned ON, the MFP 100 starts the warm-up operation.

In the step S2, the MFP 100 requests, via the LAN terminal 72, the server 5 to send environmental information. Then, the server 5 sends environmental information, which has been identified by device identification information of the MFP 100, to the first communication controlling section 79 via the LAN terminal 72. Subsequently, the CPU 111 obtains the environmental information received by the first communication controlling section 79, and then controls the HDD 75 to store the environmental information.

In a following step S3, the display section 51 is controlled to display the warm-up operation screen 170 or 170A which includes the environmental information obtained in the step S2 and the message information 145 stored in the HDD 75. Note that the warm-up operation screen 170 is displayed in a case where the display mode has been set to the thumbnail view in advance. Alternatively, the warm-up operation screen 170A is displayed in a case where the display mode of environmental information has been set to the list view in advance. The following describes, as an example, a case where the display mode has been set to the thumbnail view in advance.

In a following step S4, it is judged whether or not the warm-up operation is completed. When the completion of the warm-up operation is detected (YES in the step S4), the process proceeds to a step S5.

In the step S5, the display section 51 is controlled (i) to terminate the display of the warm-up operation screen 170 (which has been displayed in the step S4) and (ii) to instead display the initial screen 180 (see FIG. 9). As such, the environmental information is disclosed to the user at timing at which the user is not hindered from using the MFP 100.

In a following step S6, it is judged whether or not the mode of the MFP 100 has been switched to the energy saving mode. In a case where it is judged that the MFP 100 has been switched from the normal mode to the energy saving mode, the process proceeds to a step S7, otherwise the process proceeds to a step S11.

In the step S7, the display section 51 is controlled (i) to display an energy saving screen or (ii) to stop displaying.

In a following step S8, it is judged whether or not the CPU 111 has received (i) an instruction entered by the user from the operation section 53 or (ii) an operation instruction sent from an external device. In a case where it is judged that the CPU 111 has received (i) an instruction entered by the user from the operation section 53 or (ii) an operation instruction sent from an external device, the process proceeds to a step S9. When the MFP 100 receives (i) the instruction entered by the user from the operation section 53 or (ii) the operation instruction sent from the external device, the MFP 100 starts the returning operation.

In the step S9, the display section 51 is controlled to display the returning screen, and then the process proceeds to a step S10. In the step S10, it is judged whether or not the returning operation is completed. In a case where it is determined that the returning operation is completed (YES in the step S10), the process returns to the step S5.

In the step S11, it is judged whether or not the CPU 111 has received (i) an instruction entered by the user from the operation section 53 or (ii) an operation instruction sent from an external device. In a case where it is judged that the CPU 111 has received (i) an instruction entered by the user from the operation section 53 or (ii) an operation instruction sent from an external device, the process proceeds to a step S12, otherwise the process returns to the step S6.

In the step S12, the display section 51 is controlled to display a screen in accordance with the instruction entered by the user from the operation section 53 or the external operation instruction received in the step S11. The screen displayed on the display section 51 includes at least the display mode selection screen 190. Note that details of the step S12 will be described later.

In a following step S13, it is judged whether to terminate the display of the screen displayed in the step S12. When an instruction on terminating the display of the screen is entered by the user from the operation section 53, the process returns to the step S5.

Figure 12:
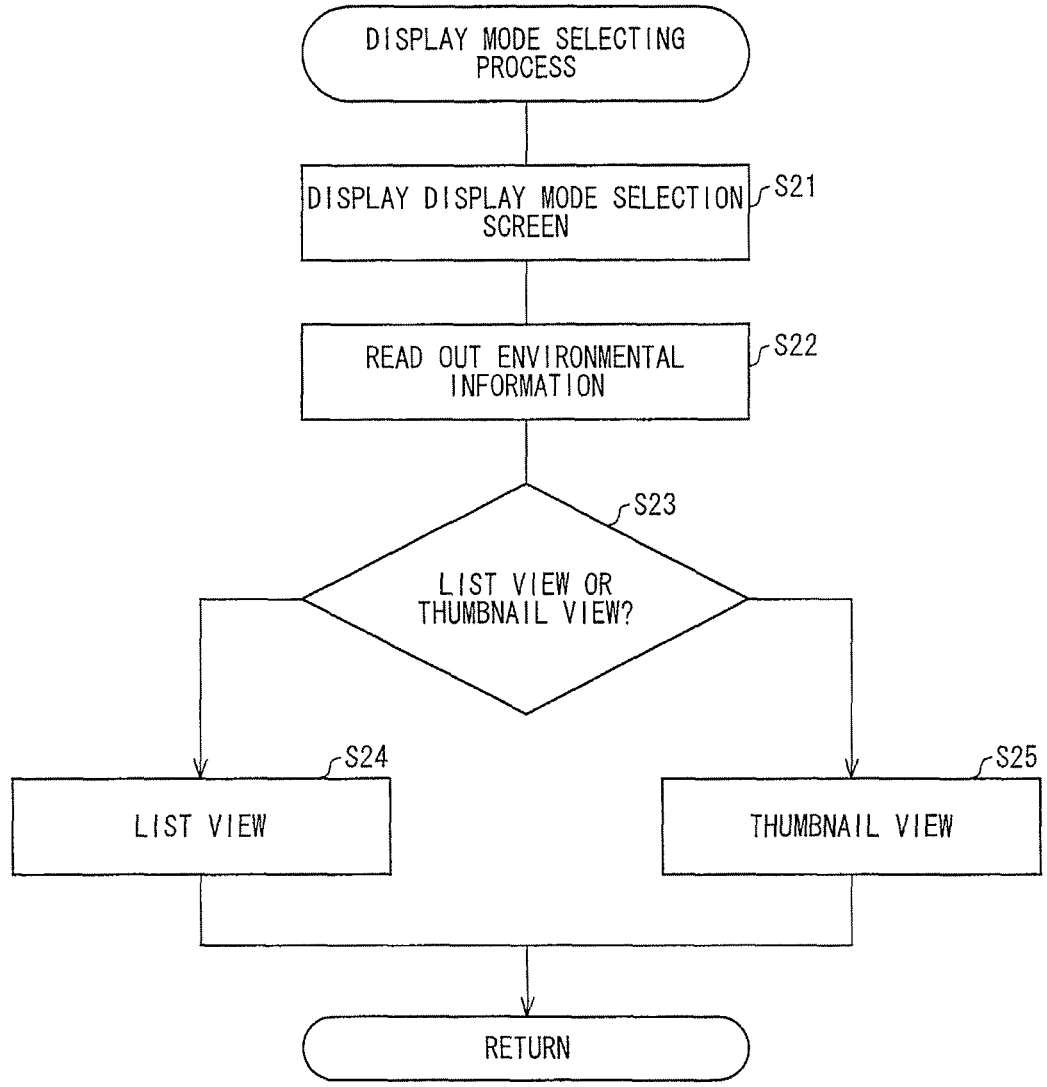
FIG. 12 is a flowchart illustrating an example of a flow of a display mode selecting process.

FIG. 12 is a flowchart illustrating an example of a flow of a display mode selecting process. The display mode selecting process is carried out in the step S12 when the eco-view button 181 is pressed in the step S11. In a step S21, the display mode selection screen 190 (see FIG. 10) is displayed, and then the process proceeds to a step S22 (see FIG. 12).

In the step S22, the environmental information 141, which has been stored in the HDD 75 in the step S2, is extracted from the HDD 75, and then the process proceeds to a step S23.

In the step S23, it is judged whether the list view or the thumbnail view is selected by the user from the display mode selection screen 190 which has been displayed in the step S21. In a case where it is judged that the list view is selected, the process proceeds to a step S24. Whereas, in a case where it is judged that the thumbnail view is selected, the process proceeds to a step S25.

In the step S24, the display section 51 is controlled to display an environmental information screen including a list of names of pieces of environmental information in the environmental information 141 which has been extracted in the step S22, and then the process returns to the screen displaying process.

In the step S25, the display section 51 is controlled to display an environmental information screen including the thumbnails of respective mark/label images in the environmental information 141 which has been extracted in the step S22, and then the process returns to the screen displaying process.

The environmental information screen is displayed when the eco-view button 181 on the initial screen 180 is pressed by the user. This allows the user to confirm the environmental information 141 at any desired timing.

Modified Example

According to the present embodiment, the operation panel 50 of the MFP 100 has an area which is large enough to have the plurality of keys. An operation panel 50A of a modified example has an area smaller than that of the operation panel 50. The operation panel 50A therefore has a limitation on the number of hard keys which can be provided on the operation panel 50A.

Figure 13:
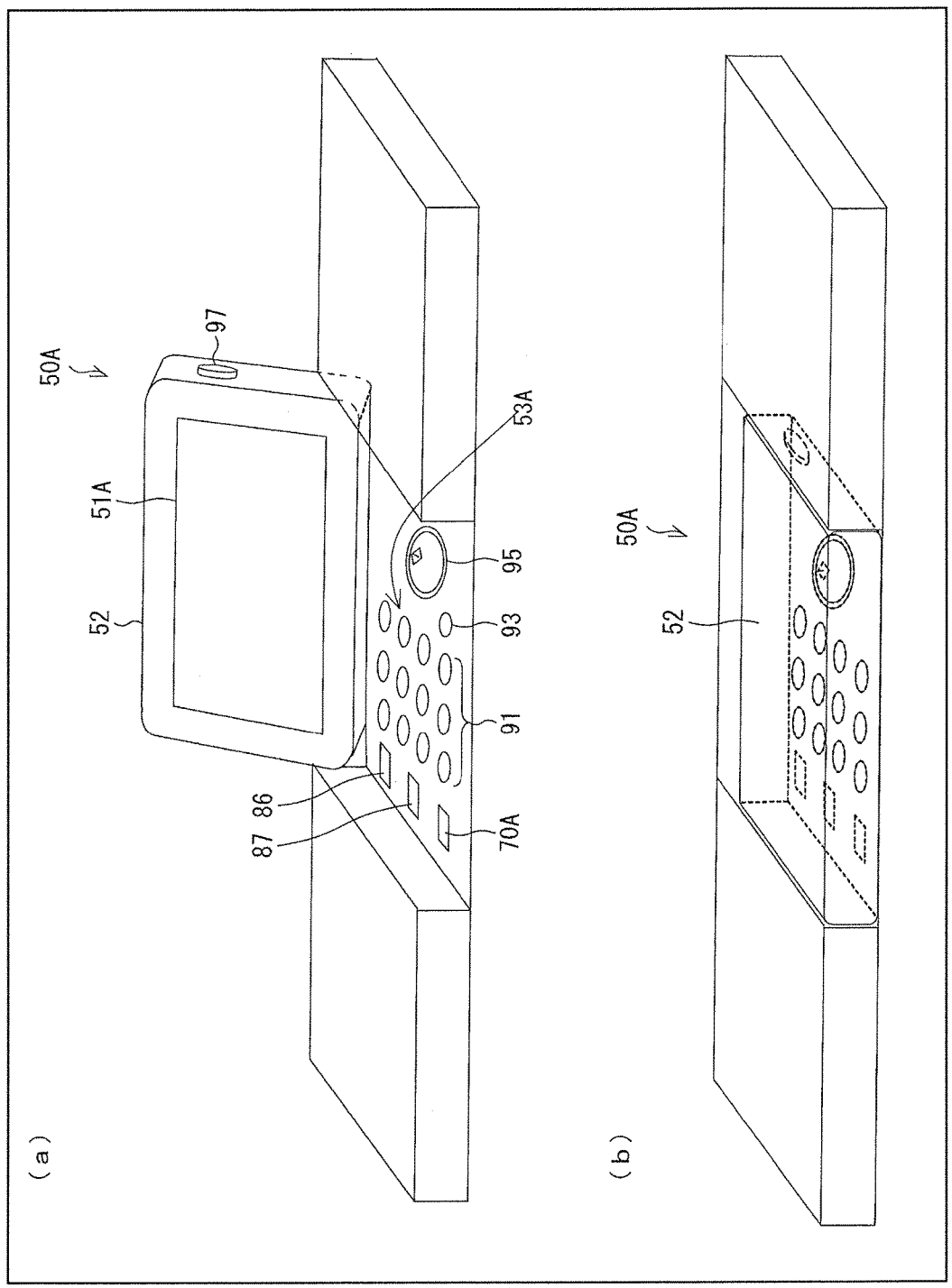
FIG. 13 illustrates an example of an operation panel of a modified example.

FIG. 13 illustrates an example of an operation panel in accordance with the present modified example. The operation panel 50A is different from the operation panel 50 illustrated in FIG. 4 in that (i) the operation panel 50A has an operation section 53A instead of the operation section 53, (ii) no display section 51 is provided on a plane on which the operation section 53 is provided, and (iii) a display panel 52 is further provided (see FIG. 13). The operation section 53A is different from the operation section 53 in that (i) there are provided none of the facsimile key 61, the print key 62, the copy key 63, the scan key 64, the typing key 65, the special function key 81, the two-sided copy key 82, the sort/staple key 83, the setting confirm key 84, the operation guide key 85, the communication status confirm key 88, the interrupt key 92, and the all release key 94 and (ii) a menu key 70A is further provided. The other constituent members of the operation section 53A are identical to those of the operation panel 50 illustrated in FIG. 4, and therefore detailed explanations of such constituent members are not repeated here.

The display panel 52 is rotatably connected with the operation section 53A via a hinge mechanism so that the display panel 52 is openable and closeable with respect to the operation section 53A. (a) of FIG. 13 illustrates a state where the display panel 52 is opened. (b) of FIG. 13 illustrates a state where the display panel 52 is closed. The display panel 52 has a display section 51A which is provided on a surface of the display panel 52 which surface faces the numeric keypad 91 when the display panel 52 is closed (see (a) and (b) of FIG. 13). The display section 51A is smaller in area than the display section 51, that is, a screen is to be displayed in a smaller area. The display panel 52 further has an eco-view key 97 which is provided on a right side face of the display panel 52. The eco-view key 97 can be operated by the user while the display panel 52 is being opened. As such, it is possible to provide a hard key which enables the user to enter, from the hard key, an instruction on displaying environmental information, even in a case where it is difficult to secure an area, which is sufficient to have such a hard key, on a surface on which the numeric keypad 91 is provided.

Note that the location where the eco-view key 97 is provided is not limited to the right side face of the display panel 52. Therefore, the eco-view key 97 can be provided on a left side face or an upper side face of the display panel 52, provided that the user can easily operate the eco-view key 97. In other words, the eco-view key 97 can be provided on an outer circumferential part of the display panel 52.

The menu key 70A is a key from which the user enters an instruction on displaying a menu screen. The menu screen includes a plurality of software keys having names of respective processes which can be carried out by the MFP 100. Examples of the software keys encompass a facsimile key, a copy key, and a scan key. With the configuration, the user can select any of processes, such as the faxing process, the copying process, and the scanning process, by pressing the menu key 70A and then operating the up key 86 and/or the down key 87.

The user enters, from the eco-view key 97, an instruction on displaying the environmental information pertinent to the MFP 100. When the user opens the display panel 52 to press the eco-view key 97, the environmental information display screen is displayed on the display section 51A.

Note that, according to the MFP 100 of the present embodiment, the initial screen 180 is displayed by the MFP 100. However, the present embodiment is not limited to this. The initial screen 180 can therefore be displayed by the PC 200, which is capable of communicating with the MFP 100 via the network 7. In such a case, the environmental information screen can be displayed by the PC 200 in response to an instruction on displaying the environmental information, which instruction is entered by the user from an operation section of the PC 200 in accordance with the initial screen 180.

According to the present embodiment, the MFP 100 requests, when the power source is turned ON, the server 5 to send the environmental information, and then the environmental information received from the server 5 is stored in the HDD 75. However, the present embodiment is not limited to this. The environmental information 141 can therefore be stored in the HDD 75 in advance.

Alternatively, the environmental information 141 can be stored in a memory device such as a USB flash memory or a memory card in advance. In such a case, the environmental information 141 is read out from the memory device so as to display the environmental information 141 on the environmental information screen, in a case where, when inserting the memory device in the MFP 100, the inserting is detected by a detector of the MFP 100.

Alternatively, the environmental information screen can be displayed when there occurs a transition of the mode of the MFP 100 to the copy mode, the scan mode, the facsimile mode, the printer mode, or the typing mode. Alternatively, the environmental information screen can be displayed when the copy mode, the scan mode, the facsimile mode, the printer mode, or the typing mode is terminated. For example, the environmental information screen can be displayed together with the message "deleting data", which is one of the plurality of messages included in the message information 145, when the scan mode, the facsimile mode, the printer mode, or the typing mode is terminated. Alternatively, the environmental information screen and the message "deleting data" can be alternately displayed.

Alternatively, the environmental information screen can be displayed instead of a setting screen (initial screen) which is being displayed, in a case where a weight sensor, which is further provided in a manual paper feeding tray, detects a sheet being placed on the manual paper feeding tray. Alternatively, the setting screen (the initial screen) and the environmental information screen can be alternately displayed. In such cases, the environmental information screen keeps being displayed until any of the keys provided on the operation panel 50 is pressed.

Alternatively, the environmental information screen can be displayed instead of the setting screen (initial screen) which is being displayed, in a case where an open/close sensor, which is further provided so as to detect open/close of the paper feeding tray, detects the paper feeding tray being opened or closed. Alternatively, the setting screen (the initial screen) and the environmental information screen can be alternately displayed.

The present invention is applicable to, for example, household appliances and commercial equipment, provided that the environmental information display screen can be displayed by the household appliance or the commercial equipment. Note that the "household appliances" refer to products or standardized products, such as electrical appliances or devices relating to video, audio, and communications, which are aimed to be used by general consumers at ordinary houses or which are developed and designed based on such premises. The "commercial equipment" refers to products developed for use in corporations (companies, schools, and public offices), etc. which are not ordinary houses.

The present invention is not limited to the embodiments, but can be altered by a skilled person in the art within the scope of the claims. An embodiment derived from a proper combination of technical means disclosed in respective different embodiments is also encompassed in the technical scope of the present invention.

Note that each block of the MFP 100, in particular, the operation accepting section 121, the mode switching section 129, the status detecting section 125, the information obtaining section 127, the display controlling section 131, and the power source ON/OFF detecting section 123 can be configured by hardware logic.

Alternatively, the MFP 100 can be arranged to be connected to a communication network so that the program codes are delivered over the communication network. The communication network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communication network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

The image forming apparatus of the present invention can further include: power source ON/OFF detecting means for detecting a power source being turned ON or OFF, the display controlling means controlling the display section to display the at least environmental information during a warm-up operation which is carried out after the power source ON/OFF detecting means detects the power source being turned ON.

According to the image forming apparatus of the present invention, it is possible that the image forming apparatus is switchable between a normal mode and an energy saving mode in which electric power is consumed less than in the normal mode; and the display controlling means controls the display section to display the at least environmental information during returning operation from the energy saving mode.

With the configuration, it is possible to easily provide an image forming apparatus which can display environmental information while a warm-up operation carried out after it is detected that a power source is turned ON or while a returning operation from an energy saving mode.

According to the image forming apparatus of the present invention, it is possible that the display controlling means controls the display section to display an initial screen which includes an icon from which an instruction on displaying the environmental information is to be entered by a user; and the display controlling means controls the display section to display the at least environmental information in response to the instruction on displaying the environmental information, which instruction has been accepted by the operation accepting means.

With the configuration, the user can check displayed environmental information at any desired timing by entering, in accordance with the initial screen, an instruction on displaying the environmental information.

According to the image forming apparatus of the present invention, it is possible that the display controlling means controls the display section to display, at the predetermined timing, the environmental information and a message corresponding to the predetermined timing.

According to the image forming apparatus of the present invention, it is possible that the display controlling means controls the display section to alternately display, at the predetermined timing, the environmental information and a message which corresponds to the predetermined timing.

If environmental information only is displayed without a message while the warm-up operation or the returning operation, an unfamiliar user may feel some anxiety. In view of this, according to the configuration, the environmental information and the message relating to the predetermined timing are displayed at the same time or alternately. This makes it possible to show the environmental information, while surely notifying even an unfamiliar user of the state of the image forming apparatus by the massage.

According to the image forming apparatus of the present invention, it is possible that the environmental information includes a plurality of images of labels and/or marks relating to environmental efforts; and the display controlling means controls the display section to display the plurality of images in a thumbnail view.

According to the image forming apparatus of the present invention, it is possible that the environmental information includes a plurality of names of labels and/or marks relating to environmental efforts; and the display controlling means controls the display section to display a list of the plurality of names.

According to the configuration, the environmental information is displayed as the thumbnail or the list. This allows the user to easily know the environmental information obtained by the image forming apparatus.

According to the image forming apparatus of the present invention, it is possible that the operation accepting means has an operation section, from which the instruction is to be entered by the user; the display section is provided so as to be openable and closeable with respect to the operation section via a hinge; and the display section has an operation key from which an instruction on displaying the environmental information is to be entered by the user, the operation key being provided on an outer circumferential part of the display section, which outer circumferential part is other than a side face on which side the hinge is provided.

According to the configuration, the display section is provided so as to be openable and closeable with respect to the operation section from which an instruction is to be entered to the operation accepting means. This allows a reduction of sizes of the display section and the operation section. Conventionally, it has been difficult to secure a space, in such a small display section or operation section, for providing an operation key (i.e., a new key) from which an instruction on displaying the environmental information is to be entered. However, according to the configuration of the present invention, the operation key is provided on the side face of the display section other than the hinged part. This makes it possible to easily locate an operation key from which an instruction on displaying the environmental information is to be entered.

REFERENCE SIGNS LIST

1: Display processing system
3: Internet
5: Server

7: Network
10: Automatic document feeder (ADF)
11: Document tray
20: Document reading section
30: Image forming section
40: Paper feeding section
41: Large capacity container
50 and 50A: Operation panel
51 and 51A: Display section
52: Display panel
53 and 53A: Operation section
60: Power switch
71: ROM
73: RAM
75: Hard disk drive (HDD)
79: First communication controlling section
100: MFP
111: CPU
121: Operation accepting section (operation accepting means)
123: Power source ON/OFF detecting section (power source ON/OFF detecting means)
125: Status detecting section
127: Information obtaining section
129: Mode switching section
131: Display controlling section (display controlling means)
200: PC

The invention claimed is:

1. An image forming apparatus including a main body, comprising:
   an operation key that accepts an operation; and
   a display panel that is provided so as to be openable and closable with respect to the operation key via a hinge, wherein
   the display panel including a display surface that is accommodated in a recessed portion provided on the main body and faces a surface arranged with a numeric keypad in an accommodated state, and an upper surface of the main body of the imaging forming apparatus and the display panel are in a flat state.

2. The image forming apparatus as set forth in claim 1, wherein the display panel is arranged such that a back surface of the display surface is generally planarly co-extensive with the upper surface of the main body in the accommodated state.

3. The image forming apparatus as set forth in claim 1, wherein the operation key includes a display panel side operation key that is arranged on a surface that is an outer circumference of the display panel except a portion of a hinge side of the display panel and is different from the display surface of the display panel, the display side operation key being used for inputting an instruction to display environment information,
   an image of a label or mark of the environment information is displayed on the display panel in response to an operation of the display device side operation key.

4. The image forming apparatus as set forth in claim 3, wherein the display panel side operation key is an operation key from which an instruction other than the image forming is input.

5. The image forming apparatus as set forth in claim 1, further comprising a display controlling portion that controls the display panel, wherein the display controlling panel controls the display portion to display environment information indicative of the environmental footprint of the image form apparatus when an instruction is input from the display panel side operation key.

6. The image forming apparatus as set forth in claim 5, wherein the environment information includes information specifying an emission amount of carbon dioxide.

7. The image forming apparatus as set forth in claim 5, wherein the environment information includes information specifying a magnitude of a sound or light concerning the image forming.

8. The image forming apparatus as set forth in claim 5, wherein the display controlling portion controls the display panel to display the environment information during a warm-up operation of the image forming apparatus.

9. The image forming apparatus as set forth in claim 5, further comprising a communication circuitry that performs a communication with a server, wherein
   the communication circuitry obtains the environment information by performing a communication with the server.

10. The image forming apparatus as set forth in claim 1, wherein the operation key includes a main body side operation key that is arranged on a surface opposite to the display panel in a closed state in the main body, the main body side operation key being used for inputting an instruction concerning with image forming.

* * * * *